Feb. 25, 1936.　　F. W. SULLIVAN, JR　　2,031,987
CONVERSION OF HYDROCARBONS
Filed Sept. 13, 1934　　2 Sheets-Sheet 1

INVENTOR
FREDERICK W. SULLIVAN JR.
BY Donald H. Mace
ATTORNEY

Feb. 25, 1936.  F. W. SULLIVAN, JR  2,031,987
CONVERSION OF HYDROCARBONS
Filed Sept. 13, 1934  2 Sheets-Sheet 2
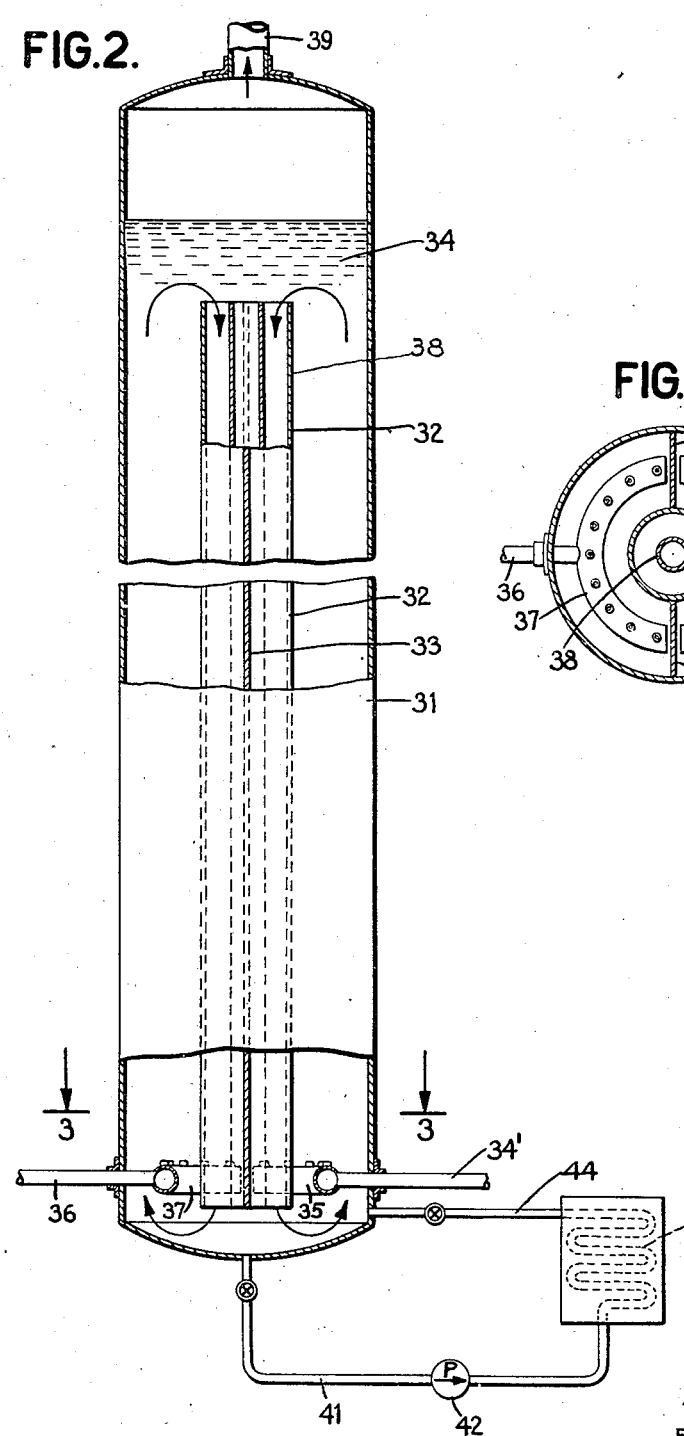
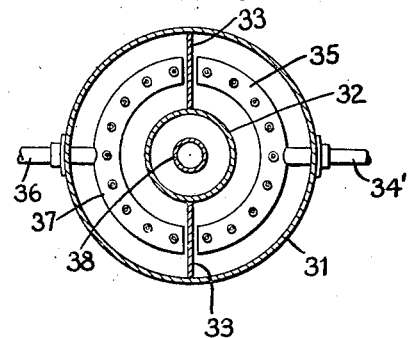
INVENTOR
FREDERICK W. SULLIVAN JR.
BY Donald H. Mace
ATTORNEY Patented Feb. 25, 1936

2,031,987

UNITED STATES PATENT OFFICE 2,031,987

CONVERSION OF HYDROCARBONS

Frederick W. Sullivan, Jr., Hammond, Ind., assignor to Standard Oil Company (Indiana), Chicago, Ill., a corporation of Indiana Application September 13, 1934, Serial No. 743,784

3 Claims. (Cl. 196—10)

This invention relates in general to the thermal conversion of hydrocarbon fluids and more especially to an operation in which a hydrocarbon fluid, such as a normally gaseous hydrocarbon containing a substantial proportion of unsaturates, is subjected to polymerization and the heat evolved incident to the exothermic polymerization reaction of the hydrocarbon fluid utilized to heat another hydrocarbon fluid, such as a high boiling hydrocarbon to be converted into a lower boiling one, and thus effect an endothermic reaction.

The heat evolved due to the exothermic reaction of the hydrocarbon fluid may be transferred to the other hydrocarbon fluid undergoing the endothermic reaction in any suitable manner, as for example, by passing the normally gaseous hydrocarbon to be polymerized in heat exchange relation with a heat transfer medium, such as molten material, to elevate the temperature of the heat transfer medium which is utilized at the elevated temperature to heat the other hydrocarbon fluid undergoing an endothermic reaction.

In accordance with my invention a normally gaseous hydrocarbon fluid having a relatively high unsaturate or olefinic content may be passed in heat exchange relation with molten material in a reaction zone and the heat evolved due to the exothermic polymerization reaction of the gaseous hydrocarbon utilized to elevate the temperature of the molten material. The molten material at the elevated temperature may then be conducted to another reaction zone through which a higher boiling hydrocarbon to be converted into a lower boiling one, such as an oil in the nature of a relatively clean gas oil, may be passed in heat exchange relation with the molten material at the elevated temperature. The higher boiling hydrocarbon may be conducted once through the zone containing the molten material at the elevated temperature and therein rapidly raised to the desired elevated temperature to accomplish high cracking per pass.

The products of reaction resulting from the heat treatment of the hydrocarbon fluids may thereafter be removed from the separate reaction zones and conducted, either separately or in blended streams, to well known after equipment for further treatment to obtain as a final product from each a motor fuel distillate, such as gasoline, of high antiknock rating. The products of reaction from each of the reaction zones are preferably separately quenched with a suitable quenching medium or if the products from each zone are blended, the quenching operation may be carried out either before or after blending.

The molten material after giving up its heat in the reaction zone wherein an endothermic cracking reaction of the hydrocarbon fluid takes place may be returned to the exothermic reaction zone and, if desired, additional heat may be supplied to the molten material either before entering the exothermic reaction zone or just prior to entering the endothermic reaction zone, or both.

In order to make may invention more clearly understood, I have shown in the accompanying drawings, means for carrying the same into practical effect without limiting the improvements in their useful applications to the particular constructions which, for the purpose of explanation, have been made the subject of illustration.

In the drawings:

Figure 2 is an elevational view, partly in section, of a modified form of apparatus for carrying out my invention.

Figure 3 is a sectional view taken along line 3—3 of Figure 2.

Figure 1:
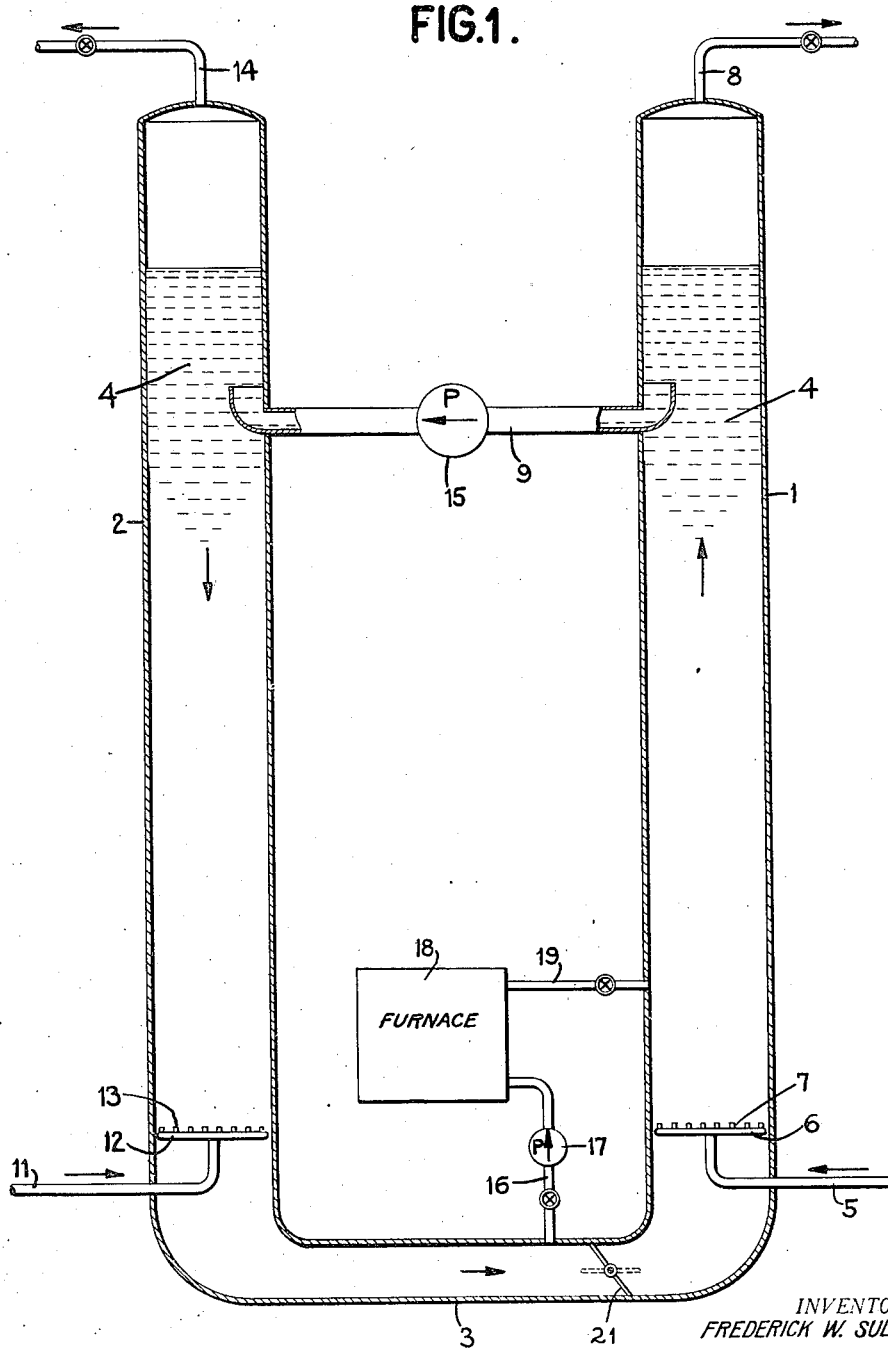
Figure 1 is a diagrammatic illustration of apparatus, in elevation, capable of carrying out my invention.

In Figure 1, I have shown an apparatus wherein the exothermic and endothermic reactions of the hydrocarbon fluids being treated may be carried out in separate reaction chambers, with means for conducting molten material that has been elevated in temperature due to the exothermic reaction of a hydrocarbon fluid to a separate reaction chamber wherein the molten material is utilized as a heat transfer medium for hydrocarbon fluid to be thermally converted. The apparatus may comprise an elongated exothermic reaction chamber 1 and a similarly elongated endothermic reaction chamber 2, the reaction chambers 1 and 2 being connected at the lower end of each by means of another chamber 3. A body of molten material 4 is maintained in each of the vertical chambers as well as the connecting chamber or pipe 3.

Any suitable molten material for the heat transfer medium may be used in accordance with my invention. For instance, molten lead, or other suitable metal or any suitable alloy of various metals, or fused salts, such as sodium hydroxide, or a mixture of fused salts, such as sodium and aluminum chlorides, may be employed. The molten material itself may function as a catalyst or if desired a suitable catalyst may be suspended or carried in solution with the molten material. The expression "molten material" used throughout the specification and claims is intended to include any suitable metal, alloy of various metals, as well as salts or mixtures of various salts, any one of which may either be a catalyst itself or act as a flux and carry the catalyst in suspension or in solution.

A material capable of undergoing an exothermic chemical reaction may be introduced into the reaction chamber 1, and therein undergo polymerization, the heat resulting from this polymerization being utilized to elevate the temperature of the molten material therein. For instance, a normally gaseous hydrocarbon fluid, having a relatively high olefinic content, may be conducted through a line 5 and passed to a distributor 6 having a plurality of spray nozzles 7, the distributor 6 and nozzles 7 being immersed in the body of molten material. The gaseous hydrocarbon may be under a relatively high pressure thereby causing a gas lift effect, the molten material contacted thereby being thus lifted or raised to a higher elevation in the reaction chamber 1. The normally gaseous hydrocarbon fluid while in contact with the molten material undergoes an exothermic polymerization reaction thereby evolving heat which is transferred to the molten material. The molten material upon receiving the additional heat evolved due to the polymerization reaction is elevated in temperature thus augmenting the rise of molten material in the reaction chamber 1. The polymerization reaction of the normally gaseous hydrocarbon is continued in the reaction chamber 1 for a sufficiently long period of time to accomplish the desired reaction thereof, the products of reaction resulting therefrom being conducted through an outlet line 8 to any well known equipment for further treatment.

The molten material at an elevated temperature rising to the upper part of the reaction chamber 1 may be conducted through the conduit 9, positive circulation therethrough being assured by a pump 15, to the endothermic reaction chamber 2 wherein it contacts the molten material therein to thereby raise the temperature thereof to approximately that obtained in the upper part of the reaction chamber 1.

A hydrocarbon fluid to be thermally converted, such as a clean gas oil, may be suitably preheated to incipient cracking conditions but without any substantial cracking in any well known apparatus and then conducted through a line 11 into a distributor 12 having spray nozzles 13, both the distributor 12 and the nozzles 13 being immersed in the molten material in the reaction chamber 2. The hydrocarbon fluid upon contacting the molten material in the reaction chamber 2 absorbs heat therefrom and is rapidly raised to the desired cracking temperature by direct heat exchange with the molten material.

In accordance with my invention, the hydrocarbon fluid passing through the reaction chamber 2 is preferably passed therethrough in a relatively short period of time and the maximum cracking per pass accomplished. The converted hydrocarbon fluid after passing in heat exchange with the molten material in the reaction chamber 2 may be conducted through a line 14 to any suitable after equipment for further treatment.

In the apparatus illustrated a continuous flow of material from the reaction chamber 1 to the reaction chamber 2 and back to the reaction chamber 1 is made possible. The normally gaseous hydrocarbon introduced through the nozzles 7 into the body of molten material in the reaction chamber 1 has a gas lift effect thereon thereby forcing the molten material contacted thereby upwardly within the reaction chamber 1. In addition to the gas lift effect, the heat evolved due to the exothermic polymerization reaction raises the temperature of the molten material thereby facilitating the ascending of the molten material to the upper part of the reaction chamber 1. Thus the molten material at the elevated temperature rises to the upper part of the reaction chamber 1 and flows through the conduit 9 into the reaction chamber 2. The hydrocarbon fluid introduced into the molten material in the reaction chamber 2, absorbs heat therefrom, thereby resulting in cooler molten material in the lower part of the reaction chamber 2 than in the upper part thereof and less gas lift effect in the chamber 2 than in the chamber 1. Thus, the heating and gas lift effect in the reaction chamber 1 together with the pump 15 causes molten material to flow into the reaction chamber 2 through the conduit 9, and due to the thermo-syphon effect, to flow from the reaction chamber 2 through the chamber or pipe 3 into the reaction chamber 1 thereby providing a continuous circuitous path for the molten material from one chamber to the other.

In accordance with my invention, additional heat may also be imparted to the molten material if desired. As shown, a stream of molten material may be removed from the chamber 3 and passed through a line 16, by means of a pump 17, through a furnace diagrammatically illustrated at 18 and therein heated to a higher temperature. The molten material at the higher temperature may be conducted from the furnace 18 through a line 19 into the reaction chamber 1 wherein it is directly contacted with the normally gaseous hydrocarbon. In lieu of heating a stream of molten material by an extraneous source and, introducing the thus heated molten material into the reaction chamber 1 in the lower portion thereof as shown, an extraneous source of heating may be provided for a stream of molten material withdrawn from the upper part of the reaction chamber 1. For instance, an arrangement similar to that just described for supplying heat to the molten material from a source extraneous to that supplied in the reaction chamber 1, may be provided for heating a stream of molten material from the upper part of the reaction chamber 1 and returning it thereto to be conducted through the conduit 9 to the reaction chamber 2. If desired, a stream of molten material may be withdrawn from both the lower and upper part of the reaction chamber 1, heated, and returned thereto.

A valve 21, actuated by means outside of the chamber 3, not shown, may be provided within the chamber 3 for regulating the quantity of molten material flowing therethrough to the reaction chamber 1.

In Figure 2, I have shown a modified form of apparatus for carrying out my invention which comprises an enlarged vessel 31 provided with a down-comer 32 placed inside the vessel 31. A partition 33, Figure 3, extends from opposite sides of the enlarged vessel 31 to the down-comer 32, thus dividing the enlarged vessel from approximately the bottom thereof to the top of the down-comer into equal parts. A body of molten material 34 is maintained within the enlarged vessel 31 to a level as indicated.

A gaseous hydrocarbon capable of undergoing an exothermic chemical reaction may be passed through a line 34' to a distributor 35 immersed in the molten material in the space on one side of the vessel provided by the partition 33. Polymerization of the gaseous hydrocarbons takes place in the presence of the molten material thus raising the temperature thereof and causing the molten material to rise, the rising thereof being augmented by the gas lift effect of the gaseous hydrocarbons. An oil to be cracked, preferably preheated, may be passed through a pipe 36 into a distributor 37 immersed in the molten material in the space provided by the partition 33 on the other side of the vessel 31. The hydrocarbon oil passing in direct heat exchange with the molten material absorbs heat therefrom resulting in an endothermic reaction. The products of reaction from both the exothermic and endothermic reactions may be conducted through an outlet pipe 39 to well known treating apparatus.

The highly heated molten material from the exothermic side of the vessel and the cooler molten material from the endothermic side of the vessel flow over the down-comer 32, and are conducted downwardly therein to the lower part of the vessel 31. In passing downwardly through the down-comer the cooler molten material from the endothermic reaction side of the vessel absorbs heat from the hotter molten material from the exothermic side of the vessel. It will thus be evident that the molten material being returned to the endothermic side of the vessel is at a higher temperature than that withdrawn therefrom while that being returned to the exothermic side is at a lower temperature than the molten material withdrawn therefrom. If desired, the down-comer 32 may be provided with a suitable conduit 38 for conducting hot combustion products therethrough to additionally heat the molten material flowing downwardly in the down-comer. The combustion products may be introduced and withdrawn in any suitable manner, and it is preferred to withdraw them separately by merely extending the conduit 38 through the top or side of the vessel. The down-comer 32 may have a vane dividing the space between it and the conduit 38 into equal parts. The vane may be rotated 180° over the full length of the down-comer, thus causing molten material from the top of one side of the vessel, such as the exothermic side, to be delivered to the base of the other side, such as the endothermic side, and vice versa.

As described in connection with Figure 1, a stream of molten material may be withdrawn from the reaction vessel to be heated to a higher temperature by an extraneous source of heat. As shown in Figure 2, a stream of molten material may be withdrawn through a line 41 and forced by means of a pump 42 through a heating coil 43 wherein it is heated to an elevated temperature in any conventional manner. The thus heated molten material may be conducted from the heating coil 43 through a line 44 back into the molten material in the enlarged vessel 31.

If additional time of contact is desired between the hydrocarbon fluids being treated and the molten material in the reaction chambers in either of the described arrangements, suitable baffles may be provided in the chambers to cause the upwardly rising hydrocarbon fluids to flow in a tortuous path throughout the reaction chambers. The time of contact between the hydrocarbon fluids and the molten material may also be regulated or altered by raising or lowering the level of molten material or by raising or lowering the points of introduction of the hydrocarbon fluids being treated. Thus when the level of the molten material is changed the soaking time of the heated hydrocarbon fluids is accordingly changed whereas with no change in the level of molten material, no change in soaking time is effected.

The products resulting from the exothermic and endothermic reactions may be quenched either in or immediately upon leaving the reaction chambers. Fresh feed, for instance, may be introduced into the space above the molten material in the reaction chambers to thus regulate the time and temperature of reaction of the products therein and simultaneously vaporize and convert the thus introduced fresh feed.

The reaction chambers may be positioned in a suitable furnace for bringing the molten material therein up to the desired operating temperatures, or if desired, any suitable means may be employed for this purpose.

In practicing my invention the apparatus shown in Figure 1 will be used for description, although it will be understood that that shown in Figure 2 is equally applicable. A normally gaseous hydrocarbon containing preferably at least 30% to 40% of olefins, preheated to a temperature of about 750° to 900° F. while under a superatmospheric pressure of about 400 to 1000 pounds per square inch, may be introduced through the line 5 and sprayed through the nozzles 7 directly into contact with the molten material in the reaction chamber 1. The reaction vessel 1 may be maintained at a pressure slightly less than that impressed upon the hydrocarbon gas.

The gaseous hydrocarbon while in contact with the heated molten material in the lower part of the reaction chamber 1, said molten material being at a temperature of about 800° F., undergoes an exothermic polymerization reaction. The heat evolved due to the polymerization of the olefinic hydrocarbon gas is transferred to the molten material thereby increasing its temperature from about 800° F. to a temperature of about 1200° F. The highly heated molten material rises in the reaction chamber 1 and flows through the conduit 9 into the reaction chamber 2 thereby maintaining the molten material in the upper part thereof in the neighborhood of 1200° F.

The effluent gases leaving the reaction chamber 1, at a temperature of about 1200° F., may contain about 4 gallons of condensible material per thousand cubic feet of charge, of which about two or three gallons will be suitable for motor fuel of the nature of gasoline, and having a high octane number. The remaining condensible material may be returned to a cracking operation, either separate to or conducted in the reaction chamber 2. Moreover the olefinic gas fraction remaining after the after treatment may be recirculated after separating out the hydrogen and methane, if any, to the reaction chamber 1 for further treatment.

A hydrocarbon fluid to be converted, in the nature of a clean gas oil, may be suitably preheated to a temperature of about 700° to 800° F. while being maintained under a superatmospheric pressure of from about 400 to 1,000 pounds per square inch and introduced through the line 11 into contact with the molten material in the reaction chamber 2 by means of the nozzles 13.

The hydrocarbon fluid is passed once through the body of molten material and therein subjected to a high cracking per pass in a relatively short period of time. For example, the hydrocarbon fluid may be passed through the molten material in less than ten seconds and preferably around 5 seconds and during its passage therethrough about 30% thereof converted into lower boiling products having a high octane number and suitable for motor fuel, such as gasoline. The vaporous constituents leaving the reaction chamber 2 through the line 14 at a temperature of about 1100 to 1200° F. as well as the products of reaction leaving through the line 8 may be immediately quenched and thereafter passed to separate or the same after equipment for further treatment in a well known manner.

While my invention has been particularly described in connection with a polymerization process in exothermic reaction chamber 1, it is to be understood that other types of processes may also be carried out therein. For instance liquid or normally gaseous hydrocarbons may be partially oxidized and simultaneously cracked therein, the heat generated by this reaction being imparted to the molten material which is conducted to the reaction chamber 2 where the molten material at an elevated temperature is utilized in cracking another hydrocarbon and preferably one having different characteristics. The necessary heat for the molten material in the reaction chamber 1 may also be generated by the complete oxidation of fuels in the same manner.

It is to be understood of course that hydrocarbon gases at high temperature direct from a gas cracking coil may be introduced into the molten material in the reaction chamber 1 so as to utilize the sensible heat of the gas as well as the exothermic heat of polymerization of the olefins therein.

For example, saturated hydrocarbon gases may be cracked for the production of gaseous olefins or liquid products say at a temperature of from 1300° to 1700° F. and then introduced into the molten material whereby the products are quickly cooled or quenched to a temperature of say 900 to 1200° F. resulting in polymerization of the unsaturated constituents thereof, thus transferring the sensible heat of the products to the molten material as well as the heat evolved due to the polymerization of the unsaturated constituents thereof.

If desired, the substance used for the molten material may be a catalyst in itself or it may act as a flux and carry the catalyst in suspension or solution. Therefore, any of the well known catalysts may be used, such as those for accelerating polymerization, and if desired, hydrogenation or dehydrogenation processes, using well known catalysts therefor, may also be carried out.

My invention may be carried out in a single reaction chamber, such as reaction chamber 1, if desired. For example, a normally gaseous hydrocarbon may be introduced into the lower portion of reaction chamber 1 and the heat liberated due to the polymerization thereof transferred to the molten material in the upward travel of the hydrocarbon. At an intermediate point in the reaction chamber, an oil to be cracked may be introduced, this oil absorbing heat from the molten material at the elevated temperature. To facilitate circulation of the molten material, a shield may be placed within the reaction chamber, the molten material from the top of the reaction chamber flowing over the top of the shield and downwardly through the space between the shield and the wall of the chamber to the lower portion of the reaction chamber.

While my invention has been shown and described for direct contact between the molten material and the hydrocarbon fluids, it is to be clearly understood that the molten material and the hydrocarbon fluids may be passed in indirect heat exchange relation with each other. For instance the hydrocarbon fluids under any suitable pressures may be conducted through coils immersed in the molten material in both of the reaction chambers or in either alone.

While my invention has been described as utilizing a fluid heat transfer medium, other heat transfer mediums may be employed. For instance, a heat exchanger made from solid metal and having interconnected passages for conveying different streams of fluids therethrough may be used, the fluid undergoing an exothermic reaction being passed through one set of interconnected passages, the heat evolved therefrom being conveyed through the metal surrounding each passage to another stream of fluid undergoing an endothermic reaction and passing through another set of interconnected passages.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. In the art of thermally converting dissimilar hydrocarbons, the improvement that comprises carrying on the process in an apparatus comprising separate reaction chambers containing molten material and interconnected to provide for cyclic circulation of the molten material between said chambers, by subjecting a hydrocarbon fluid to an exothermic reaction in contact with the molten material in one of said reaction chambers to thereby elevate the temperature of the molten material, subjecting another hydrocarbon fluid to an endothermic reaction in the other reaction chamber in contact with molten material derived from the exothermic reaction chamber whereby said hydrocarbon fluid absorbs heat from the molten material, effecting a separation of resultant products of reaction from the molten material in each of said reaction chambers, withdrawing products of reaction thus separated and maintaining a cyclic flow of molten material between the exothermic and the endothermic reaction chambers.

2. In the art of thermally converting dissimilar hydrocarbons, the improvement that comprises carrying on the process in an apparatus comprising separate reaction chambers containing molten material and interconnected to provide for cyclic circulation of the molten material between said chambers, by subjecting a normally gaseous hydrocarbon having a relatively high olefinic content to a polymerizing reaction in contact with the molten material in one of said reaction chambers with resultant evolution of heat to thereby elevate the temperature of the molten material, subjecting a higher boiling hydrocarbon oil to cracking in the other reaction chamber in contact with molten material derived from the polymerizing reaction chamber to thereby maintain said higher boiling hydrocarbon oil at a cracking temperature to effect conversion into lower boiling hydrocarbons, effecting a separation of resultant products of reaction from the molten material in the polymerizing reaction chamber and in the cracking reaction chamber, removing products of reaction thus separated and maintaining a cyclic flow of molten material between the polymerizing reaction chamber and the cracking reaction chamber.

3. An apparatus for heat treating hydrocarbon fluids comprising an exothermic reaction chamber having a body of molten material therein, means for introducing a hydrocarbon fluid into contact with the molten material in the exothermic reaction chamber to effect an exothermic reaction therein and thereby raise the temperature therein of the molten material, an endothermic reaction chamber having a body of molten material therein, means for introducing another hydrocarbon fluid into contact with the molten material in the endothermic reaction chamber to absorb heat from the molten material therein, upper and lower interconnecting means for establishing cyclic circulation of molten material between said reaction chambers, and means for withdrawing products of reaction from each of said reaction chambers at a point therein above the upper of said interconnecting means.

FREDERICK W. SULLIVAN, Jr.